United States Patent
Lakshminarasimhan et al.

(10) Patent No.: US 12,411,792 B1
(45) Date of Patent: Sep. 9, 2025

(54) INCREASED POLLING RATES IN A COMMUNICATION PROTOCOL

(71) Applicant: Logitech Europe S.A., Lausanne (CH)

(72) Inventors: Keshav Lakshminarasimhan, Tamil Nadu (IN); Prathap Chandran Rajmohan, Tamil Nadu (IN)

(73) Assignee: Logitech Europe S.A., Lausanne (CH)

( * ) Notice: Subject to any disclaimer, the term of this patent is extended or adjusted under 35 U.S.C. 154(b) by 23 days.

(21) Appl. No.: 18/588,350

(22) Filed: Feb. 27, 2024

(51) Int. Cl.
*G06F 13/42* (2006.01)
*G06F 13/10* (2006.01)

(52) U.S. Cl.
CPC ............ *G06F 13/42* (2013.01); *G06F 13/102* (2013.01)

(58) Field of Classification Search
CPC .............................. G06F 13/42; G06F 13/102
See application file for complete search history.

(56) References Cited

U.S. PATENT DOCUMENTS

| | | | | |
|---|---|---|---|---|
| 8,447,910 B1* | 5/2013 | Yi | .......................... | G06F 13/385 710/315 |
| 2004/0133708 A1* | 7/2004 | Augustin | ............ | G06F 13/4059 710/8 |
| 2013/0238820 A1* | 9/2013 | Yang | ...................... | G06F 3/038 710/19 |
| 2014/0156871 A1* | 6/2014 | Chandrasekaran | ..... | G06F 13/24 710/5 |
| 2016/0224493 A1* | 8/2016 | Wang | ...................... | G06F 13/24 |

* cited by examiner

*Primary Examiner* — Farley Abad
(74) *Attorney, Agent, or Firm* — Kilpatrick Townsend & Stockton LLP

(57) ABSTRACT

A method and apparatus for wireless communications between a Human Interface Device (HID) and a host. The host receives a plurality of virtual endpoints for a single HID, and transmits multiple polling tokens to the virtual endpoints in each period. The HID responds either with sensor data, or dummy data when there is no new sensor data. The dummy data keeps the polling proceeding, allowing time for more sensor data to appear in the same period.

20 Claims, 11 Drawing Sheets

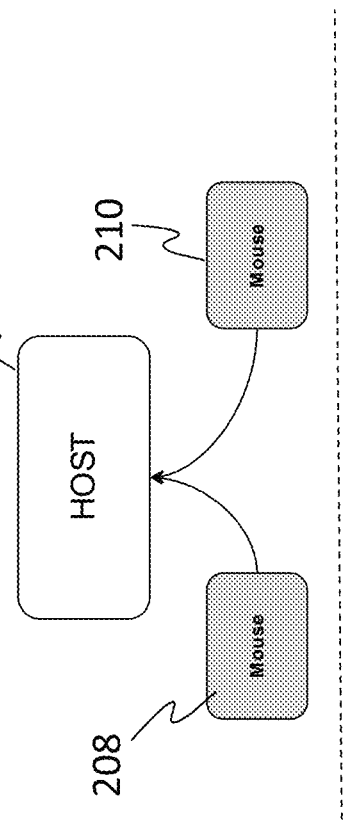
FIG. 2A
Prior Art
FIG. 2B
Prior Art
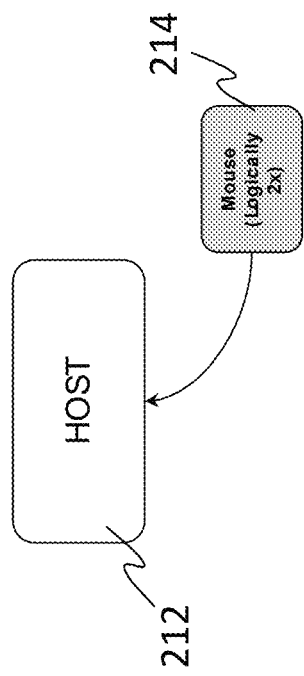
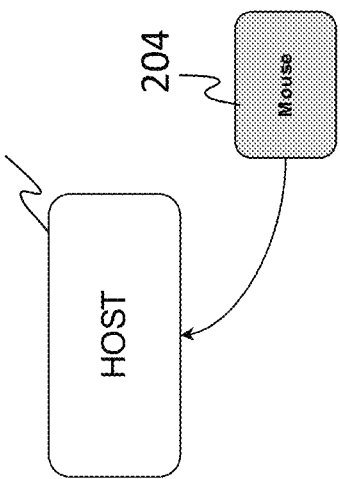
FIG. 2C

INCREASED POLLING RATES IN A COMMUNICATION PROTOCOL

FIELD

The described embodiments relate generally to Human Interface Devices (HID—e.g., a computer mouse or keyboard) in communication with a host device over a communication interface (e.g., USB via a wireless receiver, such as a dongle). More particularly, the present embodiments relate to reducing the latency of HID reports which are sent in response to host HID polling.

BACKGROUND

Displacement input devices, such as computer mice or joysticks, send a standard packet to a host, chosen and initialized upon connection to a host in accordance with a communication protocol, with fields for button presses, displacement movement, etc. In one communication protocol, the USB HID class, for example, it is required that every device describes how it will communicate with the host device. During enumeration the device describes how its reports are to be structured so that the host device can properly prepare to receive this information. The host periodically polls the HID device's interrupt IN endpoint with a poll token during operation. When the device has data to send it forms a report and sends it as a reply to the poll token. When the device has data (e.g., button press or mouse movement) after it replies to a poll token, it must wait until the next poll token, introducing latency. This latency can be noticeable to some users.

Unless otherwise indicated herein, the materials described in this section are not admitted to be prior art by inclusion in this section.

BRIEF SUMMARY OF THE INVENTION

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

In certain embodiments, a method for wired or wireless communications between a Human Interface Device (HID) and a host is described. The method includes polling a device with multiple virtual endpoints by a host. The host receives a plurality of virtual endpoints. The host then transmits to the HID, over a communications link, a first polling token for a first virtual endpoint at a first frequency. The host receives, in each period of the first frequency, a first response to each first polling token from the HID, the first response including any data from an HID sensor since a previous polling token from the host. Upon receipt of each first response, the host transmits, to at least one additional virtual endpoint, at least one additional polling token, with each additional polling token being transmitted after reception of a response from the HID to an earlier polling token. The host then receives at least a second response to the at least one additional polling token from the HID, the second response including any data from an HID sensor since the first polling token from the host.

In embodiments, a method is described for responding to a host by an HID with multiple virtual endpoints. The HID transmits to the host a plurality of virtual endpoints for the HID. The HID receives, from the host, over a communications link, a first polling token for a first virtual endpoint at a first frequency. The HID transmits to the host, in each period of the first frequency, a first response to each first polling token, the first response including any data from an HID sensor since a previous polling token from the host. After transmission of each first response, receiving, from the host, at least one additional polling token addressed to at least one additional virtual endpoint, with each additional polling token being transmitted after reception of a response from the HID to an earlier polling token. The HID then transmits, to the host, at least a second response to the at least one additional polling token, the second response including any data from an HID sensor since the first polling token from the host . . . .

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which:

FIGS. 2A and 2B show host-peripheral systems according to the prior art.

FIG. 2C illustrates a host 212 communication with a mouse 214 at an increased polling rate, according to embodiments.

DETAILED DESCRIPTION OF THE INVENTION

Aspects of the present disclosure relate generally to displacement input devices, and more particularly to systems and methods for a communication protocol having a method for reducing the number of transmitted packets, according to certain embodiments.

In the following description, various examples of increasing the polling rate for a fixed period are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

All USB mice and keyboards use HID class protocol to report the Sensor and Button values to the USB Host. USB Mouse/Keyboard can be a USB Full or High speed. On both Full and High speed, HID class uses the interrupt endpoint to transfer the HID reports. The HID report rates are configurable on USB devices in interrupt endpoints. Full speed devices can specify desired periods from 1 ms to 255 ms and High-speed devices can specify a desired speed in multiples of 125 us (called as micro frame). The current maximum allowed reporting rate as per the USB specification 2.0/3.0 for High speed is 125 us which is 8 KHz. The bandwidth of high-speed interrupt endpoint per micro frame is 3072 bytes per micro frame.

The USB host polls the interrupt endpoint based on the polling interval specified in an Interrupt endpoint descriptor (min 125 us). The host polls by sending a Start of Frame (SOF) every 125 us (micro frame) and IN token for respective endpoints to receive the data. The IN token informs the USB device that the host wishes to read information.

The following high-level summary is intended to provide a basic understanding of some of the novel innovations depicted in the figures and presented in the corresponding descriptions provided below. Aspects of the invention relate to various novel communication protocols having a method for increasing the polling rate for a fixed period.

A method and apparatus are described for a communications between a Human Interface Device (HID) and a host. The host receives a plurality of virtual endpoints for a single HID, and transmits multiple polling tokens to the virtual endpoints in each period. The HID responds either with sensor data, or dummy data when there is no new sensor data. The dummy data keeps the polling proceeding, allowing time for more sensor data to appear in the same period.

Wireless Input Device and Host System

Figure 1:
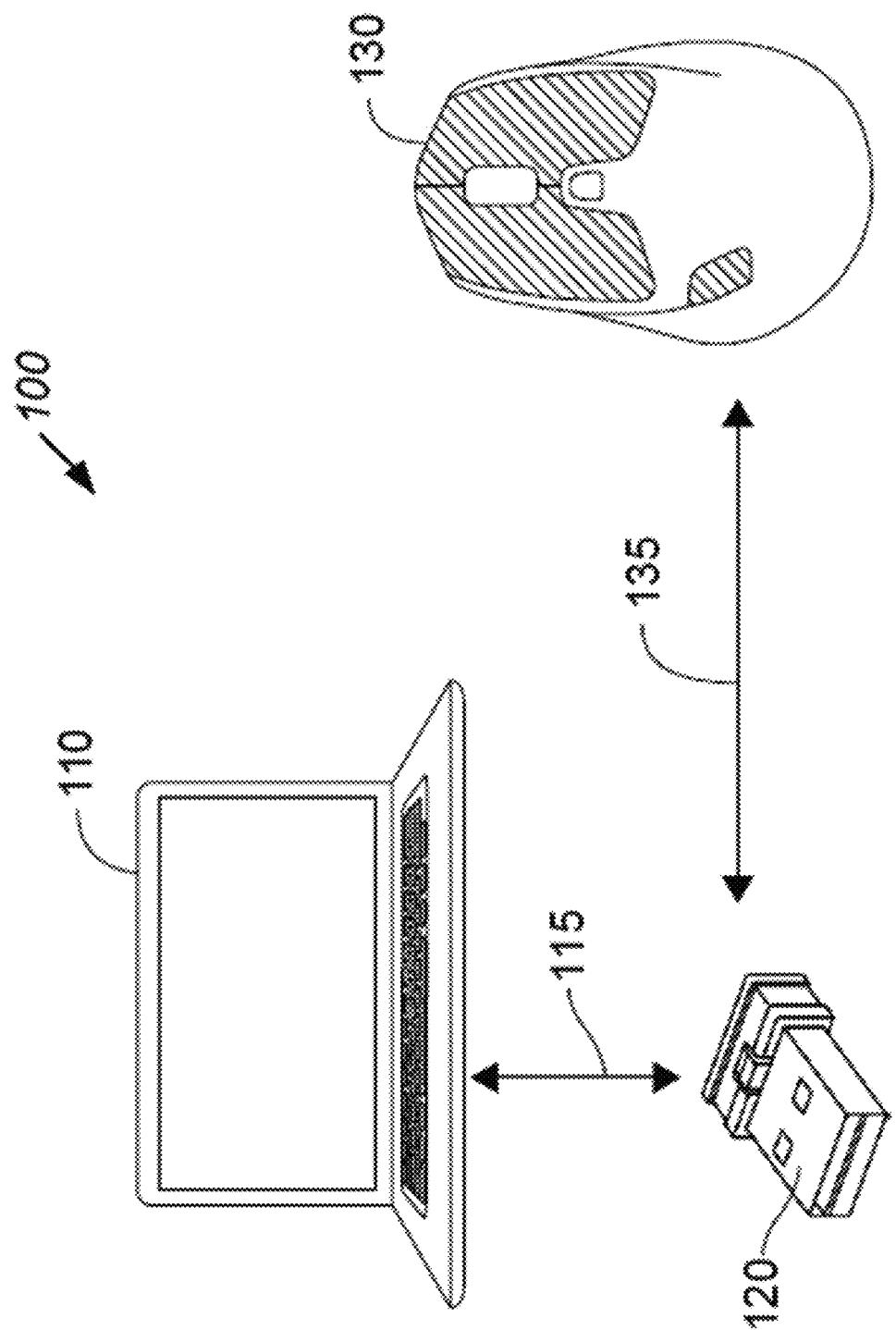
FIG. 1 shows a system including a host computing device that can be coupled to a plurality of peripheral computer devices via a wireless transceiver, according to certain embodiments.

FIG. 1 shows a system 100 including host computing device 110 that can be coupled to a plurality of peripheral computer devices 130 (e.g., a computer mouse) via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device may be coupled to multiple host computing devices (e.g., but one at a time). Transceiver 120 can be coupled to host computer via a wired or hard-wired connection.

In one embodiment transceiver 120 may be a USB transceiver (also referred to as a "dongle" herein) that is socketed in and coupled to host computer 110. In some embodiments transceiver 120 may be wirelessly coupled to host computer 110 using a Bluetooth®, BLE® or other wireless protocol. In some embodiments mouse 130 may be required to go through an initial "pairing" process with transceiver 120 where they exchange data that can include sharing their addresses, names, and profiles which can be stored in memory. The devices can also share a common secret key, which allows them to "connect" whenever they're within communications range in the future. When a peripheral device is connected to the transceiver, bidirectional communications between the devices can proceed using a data construct as described in more detail below.

In some embodiments, transceiver 120 and mouse 130 (and other peripheral devices, not shown) communicate with each other via a piconet 135, which can also be referred do as a wireless communications path. In FIG. 1 piconet 135 is illustrated as wireless communication path 135 between transceiver 120 and mouse 130. The piconet can be a packet-based protocol as described in more detail below. A piconet can include a master device (transceiver 120) and one or more servant devices (e.g., mouse 130). The master device coordinates communication throughout the piconet. The master device can send data to any of its servant devices and request data from them as well. Servant devices are allowed to transmit to and receive from their master.

Mouse 130 can alternately be any suitable computer peripheral device. For instance, the peripheral device may be a computer mouse, a gamepad, steering wheel, trackball, digital pen, etc. Each peripheral device can be wirelessly coupled to host computer 110 using a communications protocol that manages the report rate of the peripheral devices as described in more detail below. One of ordinary skill in the art with the benefit of this disclosure would appreciate the many modifications, variations, and alternative embodiments thereof. An input device may be a computer peripheral device, and may be referred to as either herein, as well as a "peripheral input device," "peripheral," or the like. The majority of the embodiments described herein generally refer to computer mouse 130, however it should be understood that a computer peripheral device can be any suitable input/output (I/O) device (e.g., user interface device, control device, input unit, or the like) that may be adapted to utilize the novel embodiments described and contemplated herein.

Polling

FIGS. 2A and 2B show host-peripheral systems according to the prior art. FIG. 2A shows a host 100 that communicates with a mouse 204. During configuration, the mouse 204 will provide its endpoint to host 202, and host 202 will issue a polling token directed to that endpoint every period of a polling frequency of the communication channel. In one example, the communication channel is a USB channel, and the frequency of polling is 8 KHz, with a period of 125 uS.

FIG. 2B illustrates a prior art host 206 communicating with two different mice 208 and 210. During configuration, each mouse will provide its endpoint to host 206, and host 206 will issue polling tokens directed to those endpoints every period of a polling frequency of the communication channel. Host 206 will issue a first polling token to the endpoint of mouse 208, and after it receives a response, will issue a second polling token to the endpoint of mouse 210. This will be repeated every period at the communications channel frequency.

FIG. 2C illustrates a host 212 communication with a mouse 214 at an increased polling rate, according to embodiments. The polling rate is increased by providing two, virtual endpoints for the same mouse 214. Thus, host 212 will poll two endpoints, as in the prior art, without knowing that it is polling a single mouse, and not two mice. As a result, the frequency at which mouse 214 can send data will increase, since it can send two responses in the same period. After mouse 214 responds to the first polling token, the host 212 will send a second polling token. Any data received by the mouse sensors since the first response (button press or displacement) can then be sent in response to the second polling token.

Mouse 214 can set up more than two endpoints, e.g., four endpoints. This allows the mouse to send two HID reports on the first and last endpoints, and a second/third endpoint sends a dummy or all 0's packet to cause the host to send the last polling token after a certain time frame. By sending two responses in a single 125 uS period of an 8 KHz USB communications channel, it essentially doubles the rate to 16 KHz without the cost of a faster channel. This reduces the latency of button presses and mouse cursor movements.

Figure 3:
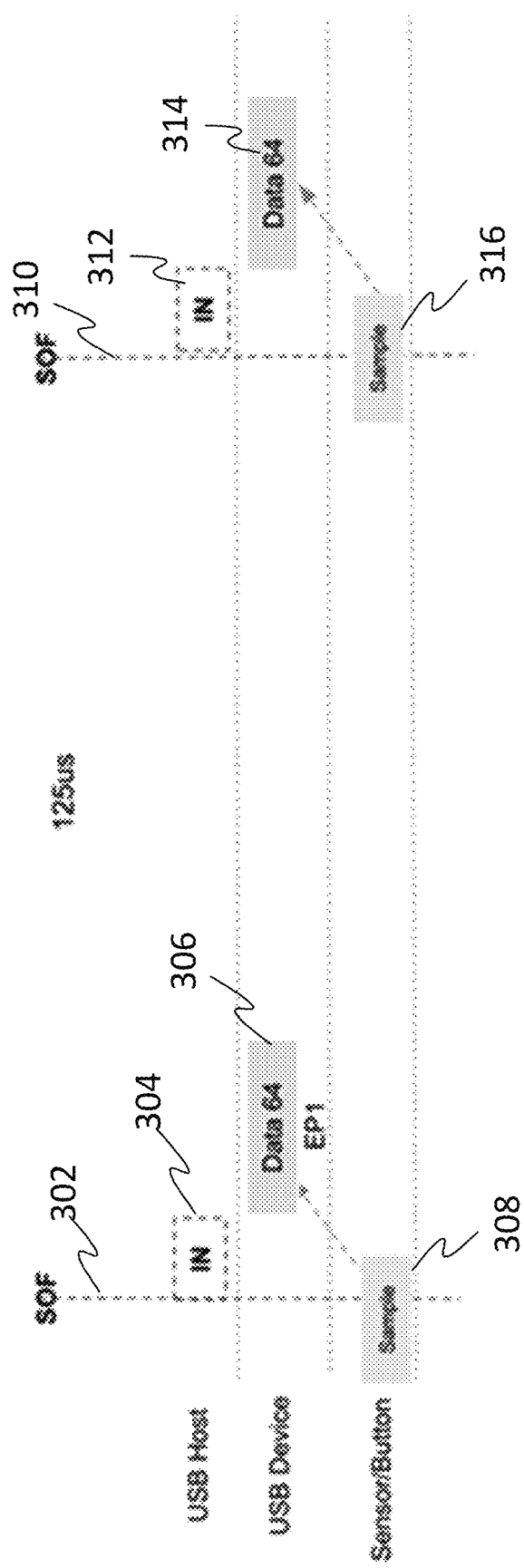
FIG. 3 is a diagram of a prior art polling and response for a single endpoint during a 125 uS polling period.

FIG. 3 is a diagram of a prior art polling and response for a single endpoint during a 125 uS polling period. At a Start of Frame (SOF) 301, the host transmits a polling token 301 to an endpoint received during configuration. In response, if the USB device (e.g., a mouse) already has a sample 308 from a sensor (button, roller, displacement), it will send a response 306 with the sample. Any samples received by the device sensors afterward in the polling period must wait until the next SOF 310. The host will issue a new polling packet 312, and the device will send a response 314 at that time with the sample 316 that was received after the last data 306 was sent.

Figure 4:
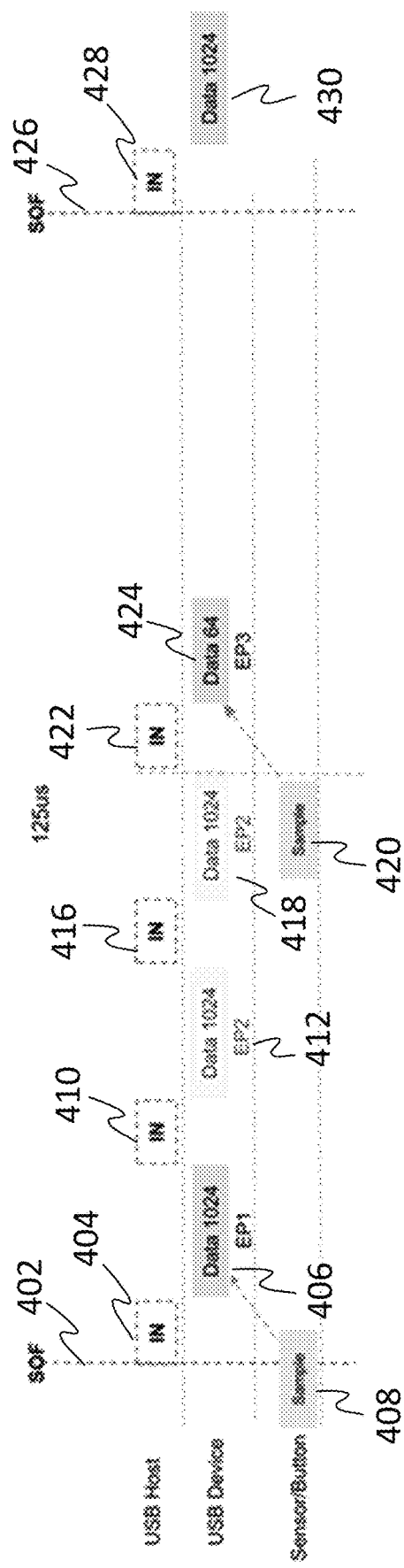
FIG. 4 is a diagram of a polling and response for multiple endpoints in a single device during a 125 uS polling period, according to embodiments.

FIG. 4 is a diagram of a polling and response for multiple endpoints in a single device during a 125 uS polling period, according to embodiments. A device has submitted three virtual endpoints during configuration. Thus, the host will issue three polling tokens during a period. After a start of frame (SOF) 402, the host issues a polling token 404 for the first virtual endpoint. In response, the device sends data 406 which contains sensor or button sample 408. After receiving data 406, the host transmits a second polling token 410 to the second virtual endpoint. The device will return dummy data (e.g., all Os). This keeps the polling going in case there is real data later in the period. The dummy data uses a large or maximum packet size to allow more time for real data to appear at the device. In one embodiment, the method plans on sending dummy data for EP2, and sending real data for EP1 and EP3, even if available earlier. The EP1 and EP2 max packet size is set to 1024 and 2048 bytes respectively to delay the process of the host sending the EP3 IN token immediately. This allows the device to sample the button and sensor events every 62 us and report them on either EP1 or EP3. In addition, the packet size of the response with real data for EP1 can be large or maximum to provide further delay.

In response to the dummy data, the host issues a third polling token 416 directed to the second virtual endpoint. In response, dummy data 418 is provided by the device. The last polling token 422 is generated in response to dummy data 418. By this time, an additional real sample 420 has arrived, and its data is provided to the host in a response 424. Absent the extra virtual endpoints and additional tokens, sample 420 would need to wait for polling token 428 at the next SOF 426, to be sent as data 430 in a response. Thus, the latency of sample 420 is reduced.

In an alternate embodiment, EP1, EP2 and EP3 all use 1024 bytes packets, while EP4 uses 64 bytes. The 64 bytes of EP4 is sufficient for both mouse and keyboard data, and there is no longer need for delay, since all polling tokens have been sent for the frame. Thus, it is desirable to use a smaller packet size to reduce the bandwidth used.

In yet another alternate embodiment, all of EP1-EP4 can contain real data, to quadruple the sample rate instead of doubling it. If sensor or button data is not available for any endpoint, a dummy packet is sent instead.

Figure 5:
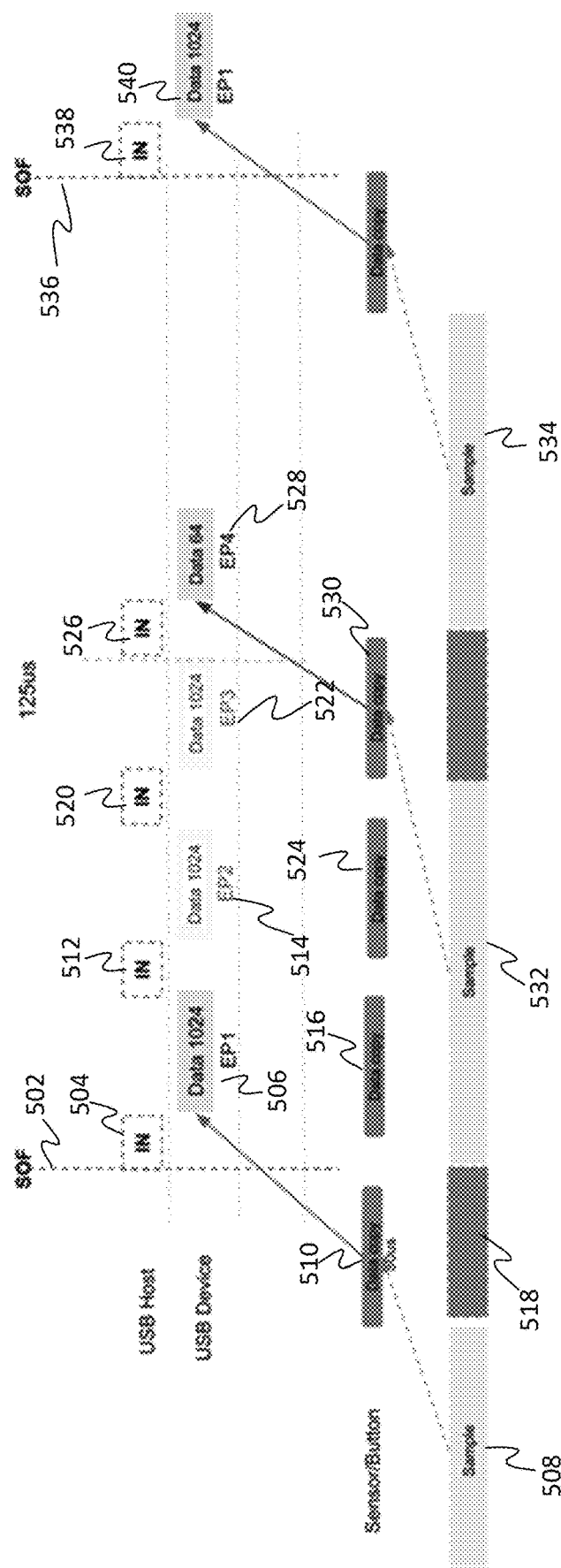
FIG. 5 is a diagram of a polling and response for multiple endpoints in a single device during a 125 uS polling period, with large size samples, according to embodiments.

FIG. 5 is a diagram of a polling and response for multiple endpoints in a single device during a 125 uS polling period, with large size samples, according to embodiments. At a SOF 502 a polling token 504 is transmitted to a first virtual endpoint. The device sends a response with data 506 including a sample 508 which arrived before the SOF 502 and is stored as data copy 510. A second polling token 512 is issued after response data 506 is received. The device has a sample 532 that is not completed yet, and thus provides a dummy data 516 in response data 514. This repeats with third polling token 520, by sending dummy data 524 in response 522. Finally, by the time of fourth polling token 526, sample 532 has completed and been recorded as data copy 530, which is provided in response 528. A subsequent sample 534 is stored and waits for the next SOF 536 and the issuance of polling token 538. The data of sample 534 is then sent as data response 540.

Absent the present invention, for displacement data, sample 532 would be overwritten in the device and replaced with sample 534. Thus, sample 532 would be lost, giving a less precise movement of a cursor with a larger movement. For button presses, the samples would not be written over, but would back up, adding more latency.

Figure 6:
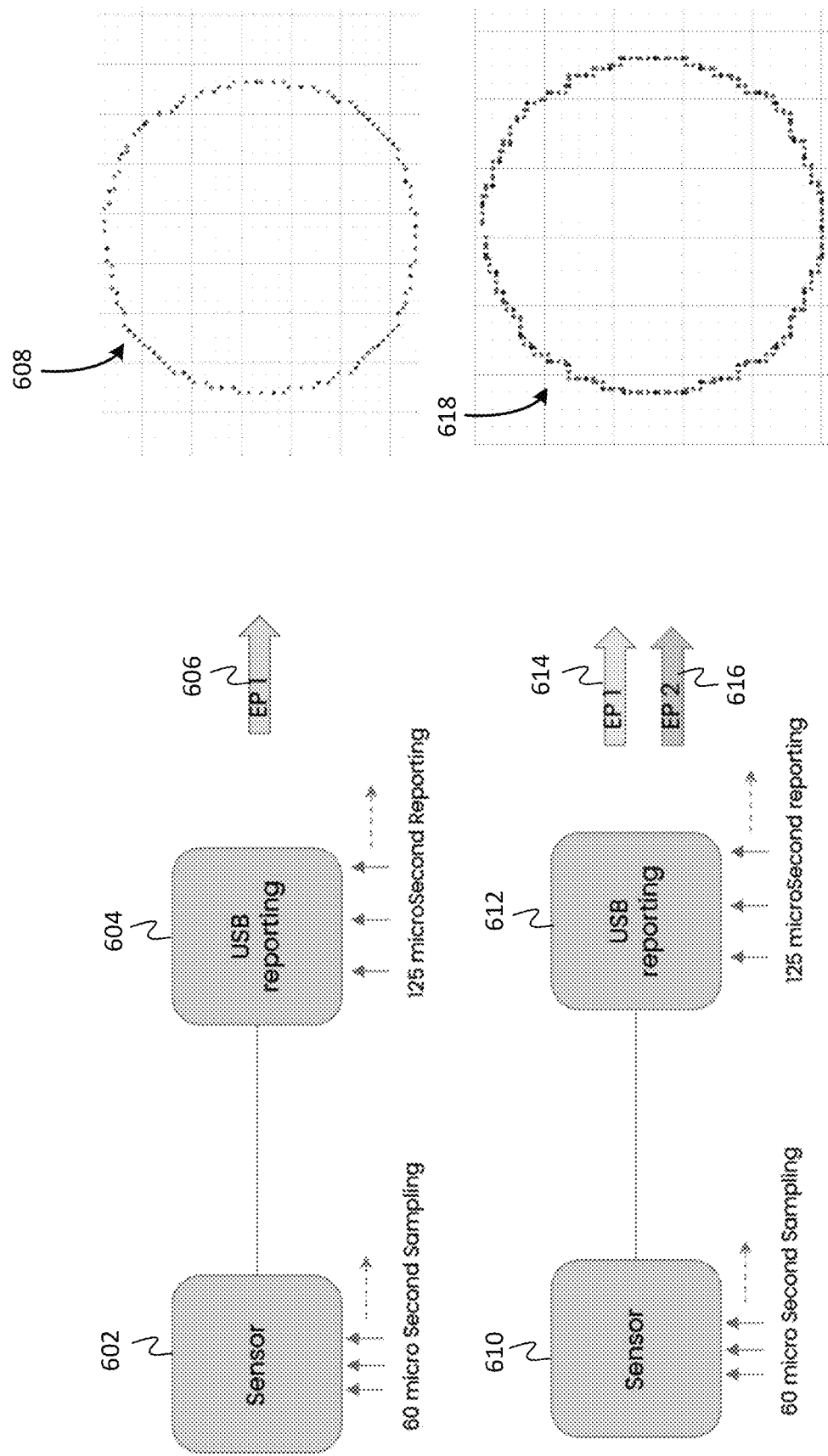
FIG. 6 is a diagram illustrating the increased displacement accuracy due to multiple virtual endpoints, according to embodiments.

FIG. 6 is a diagram illustrating the increased displacement accuracy due to multiple virtual endpoints, according to embodiments. A sensor 602 in a device (e.g., mouse) uses a 60-microsecond sampling rate, and reports the samples to a USB reporting module 604. Endpoint 606 is polled every 125 microseconds, providing a pixel each time. A display 608 shows the density of pixels when the device is used to draw a circle.

In embodiments of the present invention, a sensor 610 in a device also uses a 60-microsecond sampling rate, and reports the samples to a USB reporting module 612. Endpoint 614 is polled every 125 microseconds, providing a pixel each time. This is followed by second endpoint 616 also being polled every 125 microseconds. The resulting display 618 shows that the pixels are twice as close together, providing a smoother image.

Figure 7:
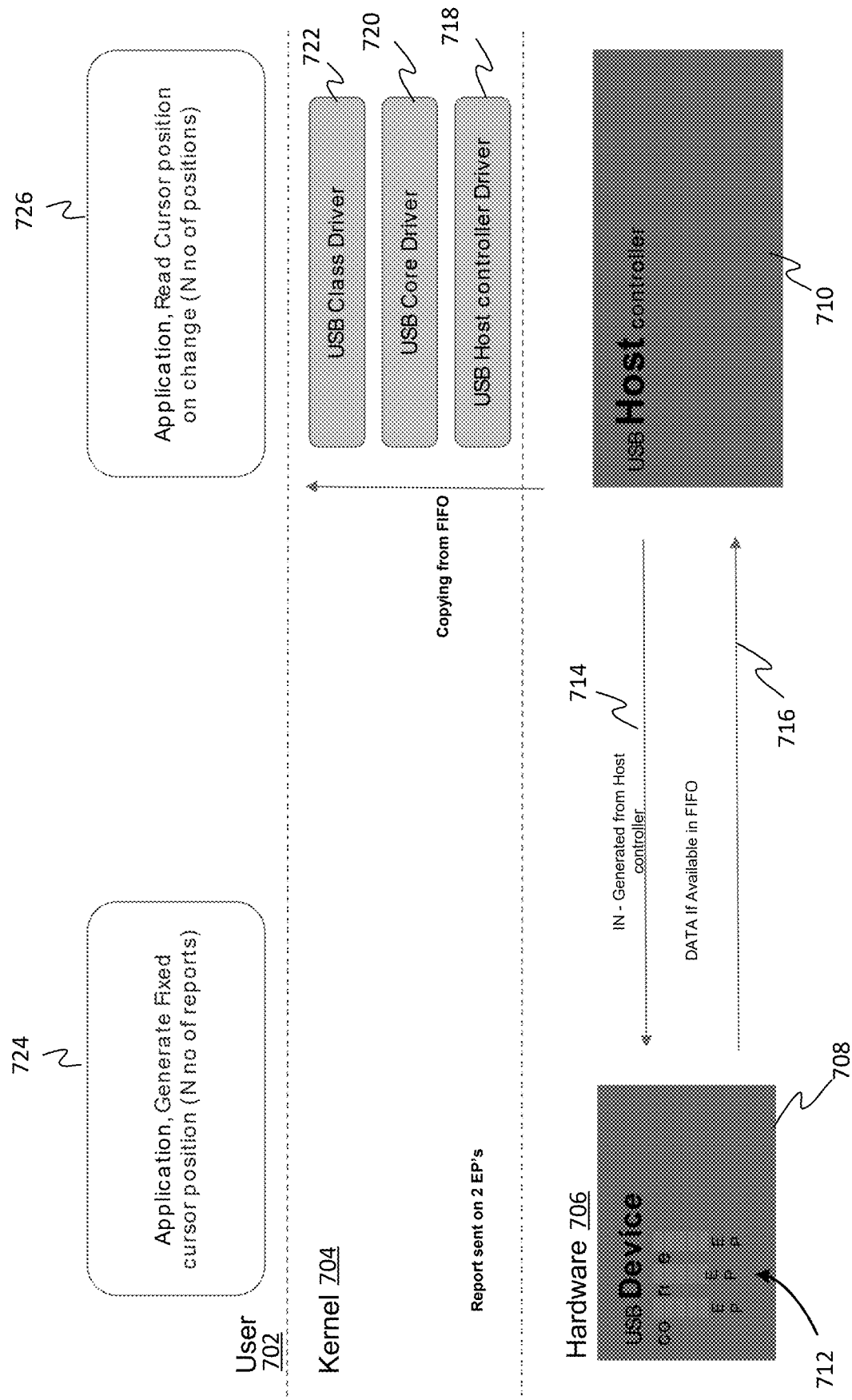
FIG. 7 is a diagram illustrating the flow of data from the device to the host to an application, according to embodiments.

FIG. 7 is a diagram illustrating the flow of data from the device to the host to an application, according to embodiments. A user level 702 contains the application, a kernel 704 contains drivers, and a hardware level 706 contains a USB device 708 and host controller 710. Device 708 has three virtual endpoints 712. The host controller 710 sends 3 polling tokens 714 as described above. In response, the device 706 returns data and dummy data 716. The host controller provides the received data to a USB host controller driver 718, which provides it to a USB core driver 720, which provides it to a USB class driver 722, which provides it to the user application. The application uses the data to first generate a fixed cursor position 724, and subsequently to generate changes to the cursor position 726, in response to N number of reports.

Alternate Embodiments

In other embodiments, multiple variations could be applied. For example, both a mouse and a keyboard could use the same USB bus. Each could have multiple virtual endpoints to increase its sampling frequency. Similarly, two mice or a plurality of any types of HIDs could each use multiple endpoints in accordance with embodiments of the invention as described above.

In one embodiment, to reduce the usage of a USB bus that interferes with other devices, the device application may have a control to reduce the report rate from 16 KHz to 8 KHz or further for an idle and other condition. For example, if there has been no data for a period of time, the report rate can be reduced, and then can be increased again when new data appears, signifying that the user is using the HID again. The reduction can happen in a number of ways. The size of the packets can be reduced to a minimum, causing the multiple polling tokens to be sent in quick succession, leaving the rest of the period open The dummy data and the last endpoint data can be skipped to reduce the bandwidth from 16 khz to 8 khz on the fly.

Flowchart

Figure 8:
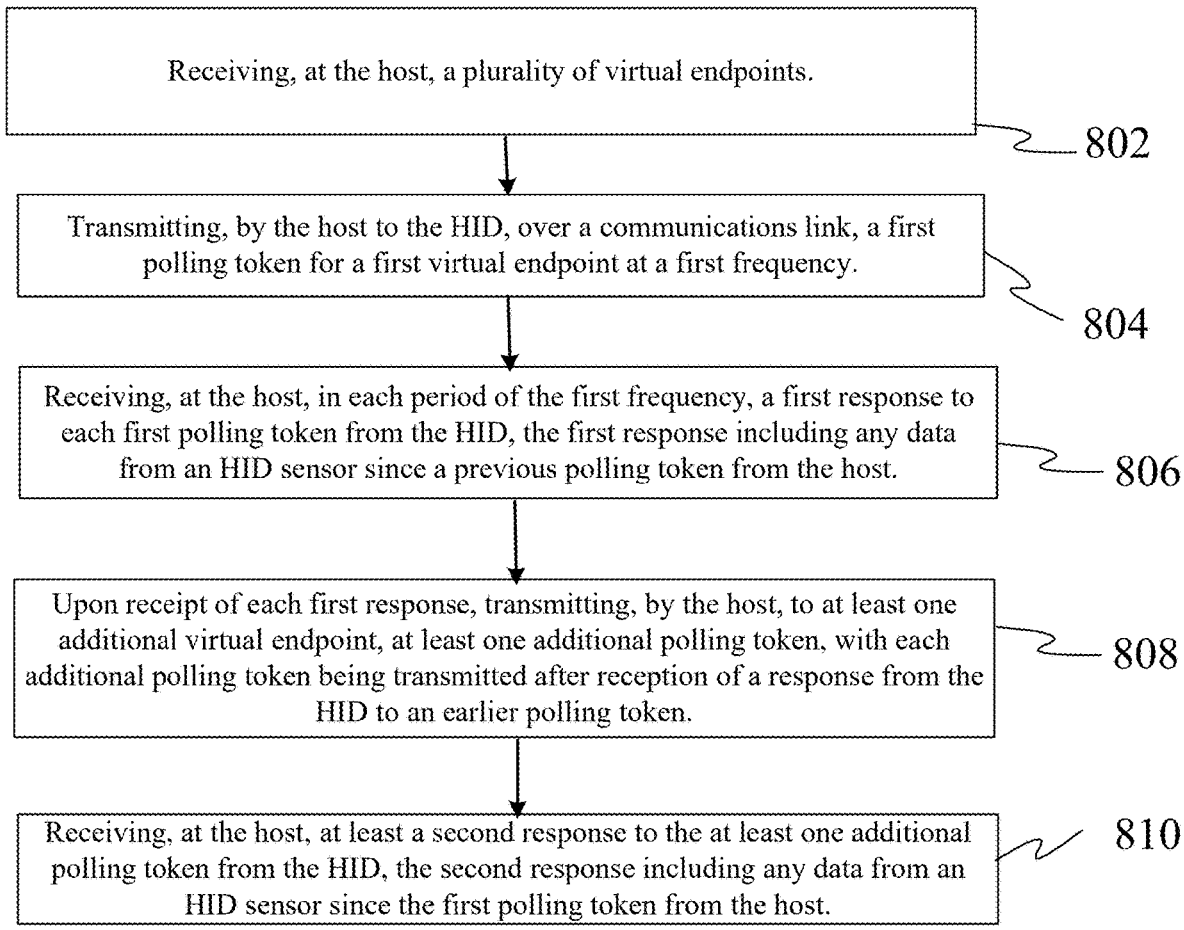
FIG. 8 is a flowchart illustrating a method of polling a device with multiple virtual endpoints by a host, according to certain embodiments.

FIG. 8 is a flowchart illustrating a method of polling a device with multiple virtual endpoints by a host, according to certain embodiments. Step 802 is receiving, at the host, a plurality of virtual endpoints. Step 804 is transmitting, by the host to the HID, over a communications link, a first polling token for a first virtual endpoint at a first frequency. Step 806 is receiving, at the host, in each period of the first frequency, a first response to each first polling token from the HID, the first response including any data from an HID sensor since a previous polling token from the host. Step 808 is upon receipt of each first response, transmitting, by the host, to at least one additional virtual endpoint, at least one additional polling token, with each additional polling token being transmitted after reception of a response from the HID to an earlier polling token. Step 810 is receiving, at the host, at least a second response to the at least one additional polling token from the HID, the second response including any data from an HID sensor since the first polling token from the host.

Figure 9:
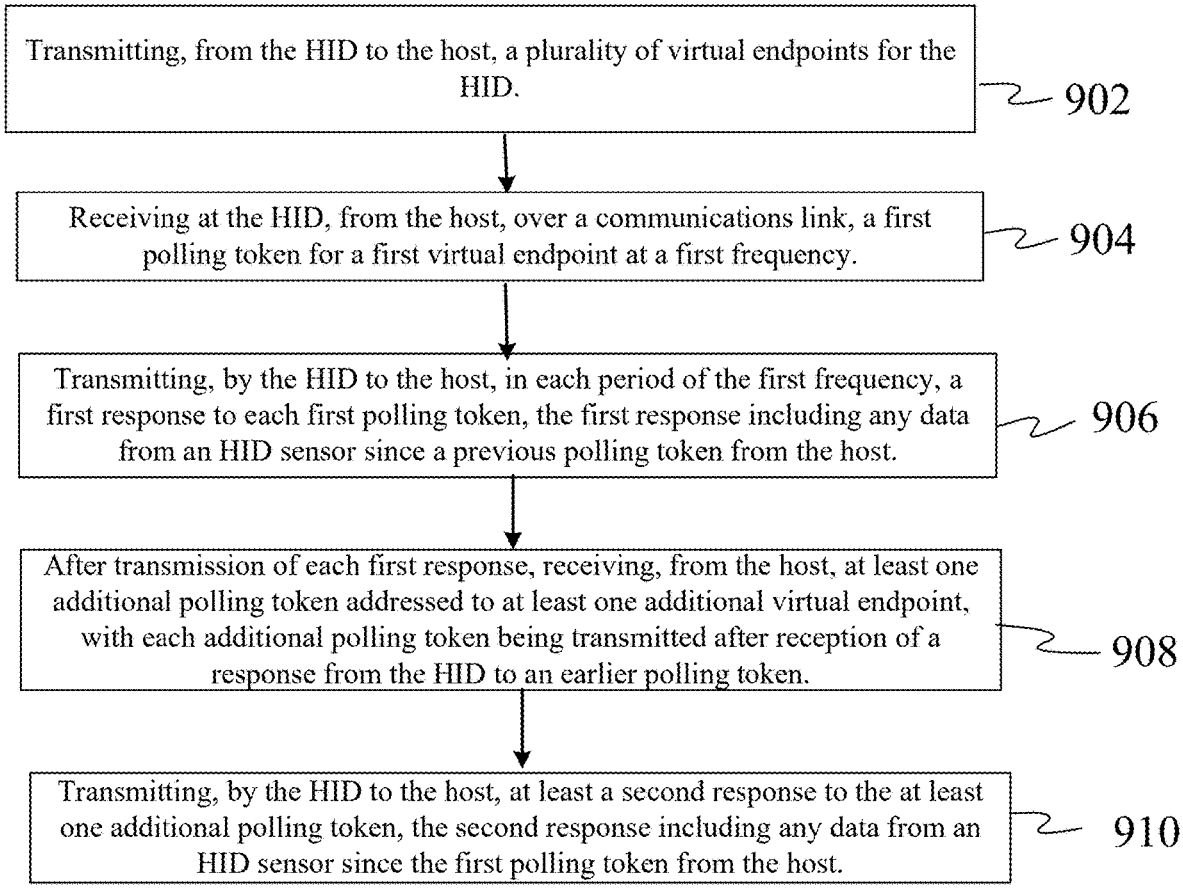
FIG. 9 is a flowchart illustrating a method of responding to a host by an HID with multiple virtual endpoints, according to certain embodiments.

FIG. 9 is a flowchart illustrating a method of responding to a host by an HID with multiple virtual endpoints, according to certain embodiments. Step 902 is transmitting, from the HID to the host, a plurality of virtual endpoints for the HID. Step 904 is receiving at the HID, from the host, over a communications link, a first polling token for a first virtual endpoint at a first frequency. Step 906 is transmitting, by the HID to the host, in each period of the first frequency, a first response to each first polling token, the first response including any data from an HID sensor since a previous polling token from the host. Step 908 is after transmission of each first response, receiving, from the host, at least one additional polling token addressed to at least one additional virtual endpoint, with each additional polling token being transmitted after reception of a response from the HID to an earlier polling token. Step 910 is transmitting, by the HID to the host, at least a second response to the at least one additional polling token, the second response including any data from an HID sensor since the first polling token from the host.

Peripheral Device

Figure 10:
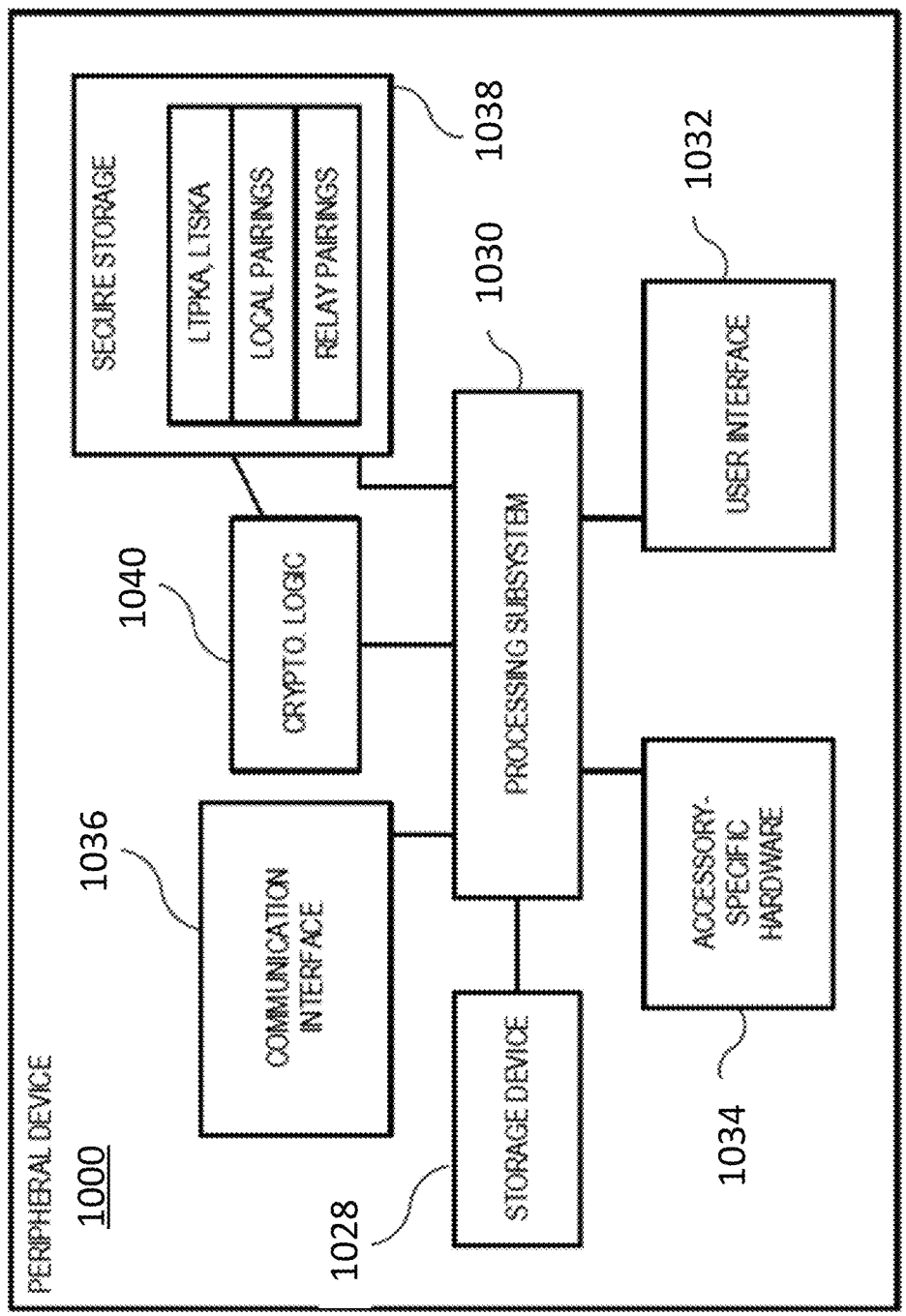
FIG. 10 shows a simplified block diagram of an example HID peripheral device, according to certain embodiments.

FIG. 10 shows a simplified block diagram of an example HID peripheral device 1000, according to certain embodiments. Peripheral device 1000 can implement any or all of the peripheral device functions, behaviors, and capabilities described herein, as well as other functions, behaviors, and capabilities not expressly described. Peripheral device 1000 can include storage device 1028, processing subsystem 1030, user interface 1032, peripheral device-specific hardware 1034, communication interface 1036, secure storage module 1038, and cryptographic logic module 1040. Peripheral device 1000 can also include other components (not explicitly shown) such as a battery, power media access devices, and other components operable to provide various enhanced capabilities.

Peripheral device 1000 is representative of a broad class of devices that can be used in conjunction with a host device and include displacement data, such as but not limited to mice, keyboards with scrolling wheels and/or cursor buttons, trackballs, gamepads, steering wheels, remote controls, pointing devices, digital pens and the like. Various accessories may include components not explicitly shown in FIG. 10, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1028 can be implemented, e.g., using disk, flash memory, or any other non-transitory storage medium, or a combination of media, and can include volatile and/or non-volatile media. In some embodiments, storage device 1028 can store one or more programs (e.g., firmware) to be executed by processing subsystem 1030, including programs to implement various operations described above as being performed by a peripheral device, as well as operations related to particular peripheral device behaviors. Storage device 1028 can also store a peripheral device object or peripheral device definition record that can be furnished to host devices, e.g., during device discovery. Storage device 1028 can also store peripheral device state information and any other data that may be used during operation of peripheral device 1000. Storage device 1028 can also store program code executable to communicate with a transceiver 120, as shown in FIG. 1, e.g., as described above.

Processing subsystem 1030 can include, e.g., one or more single-core or multi-core microprocessors and/or microcontrollers executing program code to perform various functions associated with peripheral device 1000. For example, processing subsystem 1030 can implement various processes (or portions thereof) described above as being implemented by a peripheral device, e.g., by executing program code stored in storage device 1028. Processing subsystem 1030 can also execute other programs to control other functions of peripheral device 1000. In some instances, programs executed by processing subsystem 1030 can interact with a host, e.g., by generating messages to be sent to the host and/or receiving messages from the host. In some instances, the messages can be sent and/or received using a transceiver 120, as shown in FIG. 1, as described above.

User interface 1032 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1000, a user can operate input devices of user interface 1032 to invoke functionality of peripheral device 1000 and can view and/or hear output from peripheral device 1000 via output devices of user interface 1032. Some accessories may provide a minimal or no user interface. Where the peripheral device does not have a user interface, a user can still interact with the peripheral device using a host (e.g., host 1100).

Peripheral device-specific hardware 1034 can include any other components that may be present in peripheral device 1000 to enable its functionality. For example, in various embodiments peripheral device-specific hardware 1034 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1034 and that peripheral device-specific hardware can include mechanical as well as electrical or electronic components.

Communication interface 1036 can provide voice and/or data communication capability for peripheral device 1000. In some embodiments communication interface 1036 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1036 can provide wired network connectivity (e.g., Ethernet) in addition to or instead of a wireless interface. Communication interface 1036 can be implemented using a combination of hardware (e.g., driver circuits, antennas, modulators/demodulators, encoders/decoders, and other analog and/or digital signal processing circuits) and software components. In some embodiments, communication interface 1036 can support multiple communication channels concurrently or at different times, using the same transport or different transports. Thus, for example, peripheral device 1000 can communicate with a host via a local channel at some times and via a relay service at other times.

Secure storage module 1038 can be an integrated circuit or the like that can securely store cryptographic information for peripheral device 1000. Examples of information that can be stored within secure storage module 1038 include the peripheral device's long-term public and secret keys (LTPKA, LTSKA), a list of local pairings (e.g., a lookup table that maps a local host identifier to a host long-term public key (LTPKC) for hosts that have completed a local pair setup or pair add process, e.g., as described above, with peripheral device 1000), and a list of relay pairings (e.g., host Ras and associated access tokens for hosts that have established a relay pairing, e.g., as described above, with peripheral device 1000). In some embodiments, pairing information can be stored such that a local pairing is mapped to the corresponding relay pairing in instances where both a local pairing and a relay pairing with the host have been established. In some embodiments, secure storage module 1038 can be omitted; keys and lists of paired hosts can be stored in storage device 1028.

In some embodiments, cryptographic operations can be implemented in a cryptographic logic module 1040 that communicates with secure storage module 1038. Physically, cryptographic logic module 1040 can be implemented in the same integrated circuit with secure storage module 1038 or a different integrated circuit (e.g., a processor in processing subsystem 1030) as desired. Cryptographic logic module 1040 can include various logic circuits (fixed or programmable as desired) that implement or support cryptographic operations of peripheral device 1000, including any or all cryptographic operations described above. Secure storage module 1038 and/or cryptographic logic module 1040 can appear as a "black box" to the rest of peripheral device 1000. Thus, for instance, communication interface 1036 can receive a message in encrypted form that it cannot decrypt and can simply deliver the message to processing subsystem 1030. Processing subsystem 1030 may also be unable to decrypt the message, but it can recognize the message as encrypted and deliver it to cryptographic logic module 1040. Cryptographic logic module 1040 can decrypt the message (e.g., using information extracted from secure storage module 1038) and determine what information to return to processing subsystem 1030. As a result, certain information can be available only within secure storage module 1038 and cryptographic logic module 1040. If secure storage module 1038 and cryptographic logic module 1040 are implemented on a single integrated circuit that executes code only from an internal secure repository, this can make extraction of the information extremely difficult, which can provide a high degree of security. Other implementations are also possible.

Peripheral device 1000 can be any electronic apparatus that interacts with host 1100. In some embodiments, host 1100 can provide remote control over operations of peripheral device 1000 as described below. For example, host 1100 can provide a remote user interface for peripheral device 1000 that can include both input and output controls (e.g., a display screen to display current status information obtained from peripheral device 1000 and an input control such as a touchscreen overlay to allow changes to the status information). Host 1100 in various embodiments can control any function of peripheral device 1000 and can also receive data from peripheral device 1000, via a transceiver 120, as shown in FIG. 1.

Host

Figure 11:
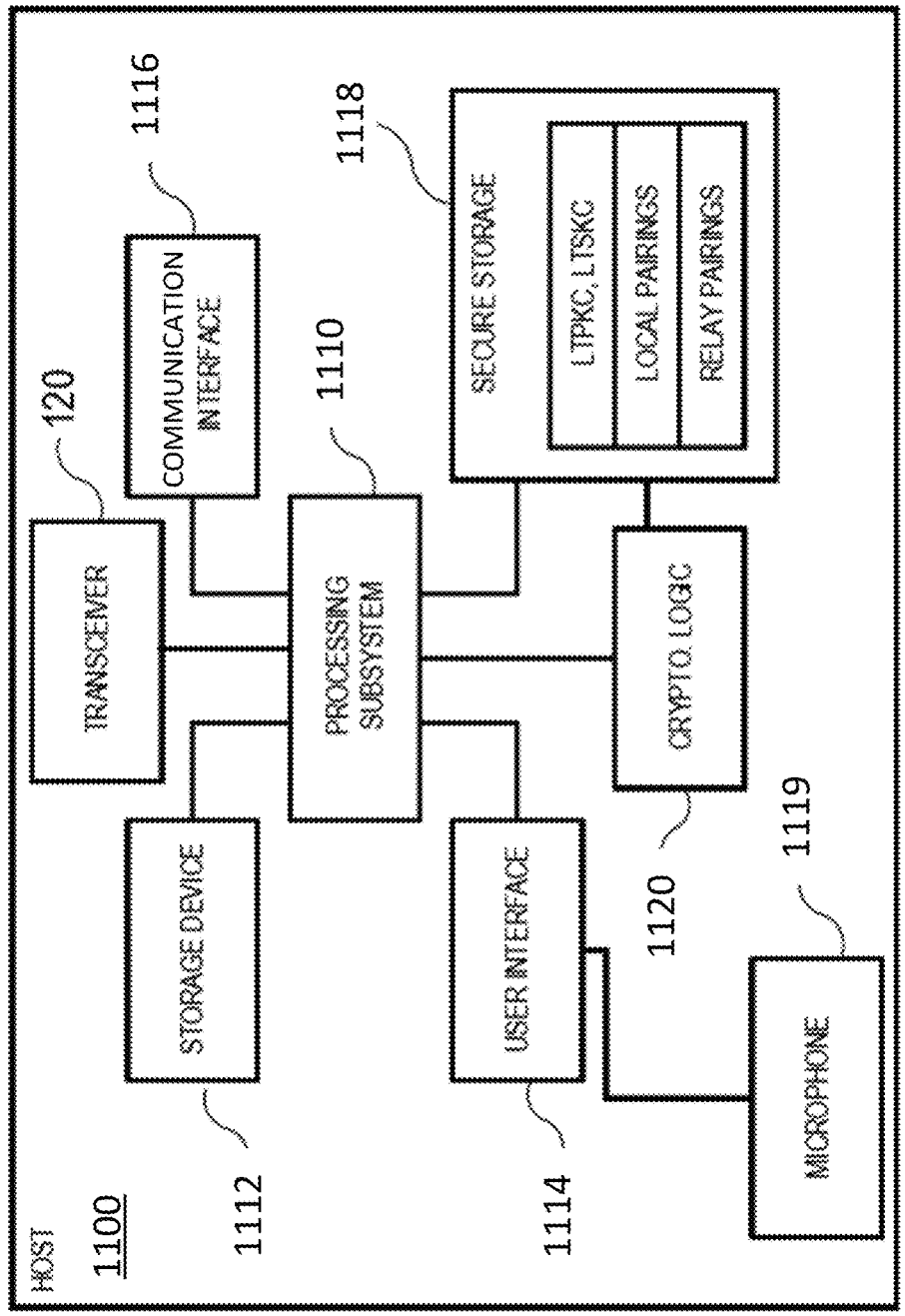
FIG. 11 shows a simplified block diagram of an example host, according to certain embodiments.

FIG. 11 shows a simplified block diagram of an example host 1100, according to certain embodiments. In some embodiments, host 1100 can implement any or all of the functions, behaviors, and capabilities described herein as being performed by a host, as well as other functions, behaviors, and capabilities not expressly described. Host 1100 can include processing subsystem 1110, storage device 1112, user interface 1114, communication interface 1116, secure storage module 1118, and cryptographic logic module 1120. Host 1100 can also include other components (not explicitly shown) such as a battery, power controllers, and other components operable to provide various enhanced capabilities. In various embodiments, host 1100 can be implemented in a desktop computer, laptop computer, tablet computer, smart phone, other mobile phone, wearable computing device, or other systems having any desired form factor. Further, as noted above, host 1100 can be implemented partly in a base station and partly in a mobile unit that communicates with the base station and provides a user interface. Transceiver 120 of FIG. 1 is shown as part of host 1100, and can be removable, such as in a dongle connected to a USB port.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a host. For example, storage device 1112 can store a uniform host application that can read a peripheral device description record and generate a graphical user interface for controlling the peripheral device based on information therein. Storage device 1112 can also store program code executable to communicate with a transceiver 120, as shown in FIG. 1, e.g., as described above. Although FIG. 10 illustrates transceiver 120 as a subsystem of host 1100 it is understood that transceiver 120 may be a dongle that is plugged into and electrically coupled with host 1100. Transceiver 120 may contain its own processor for processing received packets as described above, or can be controlled by host processing system 1110 which will perform those functions. In some embodiments, portions (or all) of the host functionality described herein can be implemented in operating system programs rather than applications. In some embodiments, storage device 1112 can also store apps designed for specific accessories or specific categories of accessories (e.g., an IP camera app to manage an IP camera peripheral device or a security app to interact with door lock accessories).

User interface 1114 can include input devices such as a touch pad, touch screen, scroll wheel, click wheel, dial, button, switch, keypad, microphone 1119, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of host 1100 and can view and/or hear output from host 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of host 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for host 1100. For example, in some embodiments, processing subsystem 1110 can implement various processes (or portions thereof) described above as being implemented by a host. Processing subsystem 1110 can also execute other programs to control other functions of host 1100, including application programs that may be stored in storage device 1112. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1116 can provide voice and/or data communication capability for host 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports. Thus, for example, host 1100 can communicate with accessories via a local channel at some times and via a relay service at other times.

Secure storage module 1118 can be an integrated circuit or the like that can securely store cryptographic information for host 1100. Examples of information that can be stored within secure storage module 1118 include the host's long-term public and secret keys (LTPKC, LTSKC), a list of local pairings (e.g., a lookup table that maps a local peripheral device identifier to a peripheral device long-term public key (LTPKA) for accessories that have completed a local pair setup or pair add process, e.g., as described above, with host 1100), and a list of relay pairings 1126 (e.g., peripheral device Ras and associated access tokens for accessories that have established a relay pairing, e.g., as described above, with host 1100). In some embodiments, pairing information can be stored such that a local pairing 1124 is mapped to the corresponding relay pairing 1126 in instances where both a local pairing and a relay pairing with the peripheral device have been established.

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of host 1100, including any or all cryptographic operations described above. Secure storage module 1118 and/or cryptographic logic module 1120 can appear as a "black box" to the rest of host 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1100 can perform all operations described above as being performed by a media access device and that an implementation of peripheral device 1000 can perform any or all operations described above as being performed by a peripheral device. A proxy, bridge, tunnel, or coordinator can combine components of host 1100 and peripheral device 1000, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Embodiments of the present invention reduce the number of packets and eliminate the overhead of empty fields during the wireless transmission. In addition, a variable reduced size field can be used to provide the displacement data. A USB transceiver (e.g., transceiver 120 of FIG. 1) connected to a computer can convert received packets back into a standard format by adding back the eliminated fields. The reduced size fields can be restored to their standard length. Thus, this system is backward compatible with software and firmware expecting a standard packet, while at the same time reducing the size of the wireless transmissions.

These embodiments require more processing to convert from the reduced size packets back to the standard packets. However, this processing is mainly done in the transceiver connected to computer power, and does not require battery power from the input device. Processing done in the input device processor consumes less power than the transceiver transmissions. Thus, a trade-off is made to achieve less battery drain and reduced wireless bandwidth requirements.

These embodiments provide multiple advantages. Battery life is improved since less data is transmitted, thus lessening the time the transceiver needs to be transmitting and drawing power. The bandwidth is improved at the same mouse polling rate. Alternately, a higher mouse polling rate is possible. There is more robustness to interference since the packets are shorter, and thus there is less risk of collision with interfering transmissions.

Alternate Embodiments

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for communications between a Human Interface Device (HID) and a host, the method comprising:
    receiving, at the host, a plurality of virtual endpoints;
    transmitting, by the host to the HID, over a communications link, a first polling token for a first virtual endpoint at a first frequency;
    receiving, at the host, in each period of the first frequency, a first response to each first polling token from the HID, the first response including any data from an HID sensor since a previous polling token from the host;
    upon receipt of each first response, transmitting, by the host, to at least one additional virtual endpoint, at least one additional polling token, with each additional polling token being transmitted after reception of a response from the HID to an earlier polling token; and
    receiving, at the host, at least a second response to the at least one additional polling token from the HID, the second response including any data from an HID sensor since the first polling token from the host.

2. The method of claim 1 wherein the communications link is a USB link.

3. The method of claim 1 wherein the communications link is a wireless link.

4. The method of claim 1 wherein the at least one additional polling token comprises three additional polling tokens.

5. The method of claim 1 wherein the receiving a plurality of virtual endpoints occurs during a configuration of the HID.

6. The method of claim 1 further comprising:

receiving dummy data from the HID when no additional data is available in response to one of the polling tokens, the dummy data having a maximum packet size.

7. A method for communications between a Human Interface Device (HID) and a host, the method comprising:
transmitting, from the HID to the host, a plurality of virtual endpoints for the HID;
receiving at the HID, from the host, over a communications link, a first polling token for a first virtual endpoint at a first frequency;
transmitting, by the HID to the host, in each period of the first frequency, a first response to each first polling token, the first response including any data from an HID sensor since a previous polling token from the host;
after transmission of each first response, receiving, from the host, at least one additional polling token addressed to at least one additional virtual endpoint, with each additional polling token being transmitted after reception of a response from the HID to an earlier polling token; and
transmitting, by the HID to the host, at least a second response to the at least one additional polling token, the second response including any data from an HID sensor since the first polling token from the host.

8. The method of claim 7 wherein the HID is one of a computer mouse, a trackball, a joystick, a gamepad, a steering wheel or a touchpad.

9. The method of claim 7, wherein the data from an HID sensor includes at least one of x-y displacement data, z-displacement data, wheel rotation data, trackball rotation data, joystick or mini-joystick data, D-pad data, accelerometer data or tilt sensor data.

10. The method of claim 7 further comprising:
receiving dummy data from the HID when no additional data is available in response to one of the polling tokens.

11. The method of claim 7 wherein the communications link is a wireless USB link.

12. A system for communications between a Human Interface Device (HID) and a host, the system comprising:
an HID;
a displacement sensor mounted in the HID;
an HID processor mounted in the HID;
an HID memory coupled to the HID processor, the HID memory including non-transitory computer readable medium having stored thereon software instructions that, when executed by the HID processor, cause the HID processor to execute steps comprising:
transmitting, from the HID to the host, a plurality of virtual endpoints for the HID;
receiving at the HID, from the host, over a communications link, a first polling token for a first virtual endpoint at a first frequency;
transmitting, by the HID to the host, in each period of the first frequency, a first response to each first polling token, the first response including any data from an HID sensor since a previous polling token from the host;
after transmission of each first response, receiving, from the host, at least one additional polling token addressed to at least one additional virtual endpoint, with each additional polling token being transmitted after reception of a response from the HID to an earlier polling token; and
transmitting, by the HID to the host, at least a second response to the at least one additional polling token, the second response including any data from an HID sensor since the first polling token from the host.

13. The system of claim 12 further comprising:
a host;
a host processor;
a host memory coupled to the host processor, the host memory including non-transitory computer readable medium having stored thereon software instructions that, when executed by the host processor, cause the host processor to execute the steps comprising:
receiving, at the host, a plurality of virtual endpoints;
transmitting, by the host to the HID, over a communications link, a first polling token for a first virtual endpoint at a first frequency;
receiving, at the host, in each period of the first frequency, a first response to each first polling token from the HID, the first response including any data from an HID sensor since a previous polling token from the host;
upon receipt of each first response, transmitting, by the host, to at least one additional virtual endpoint, at least one additional polling token, with each additional polling token being transmitted after reception of a response from the HID to an earlier polling token; and
receiving, at the host, at least a second response to the at least one additional polling token from the HID, the second response including any data from an HID sensor since the first polling token from the host.

14. The system of claim 12 wherein the communications link is a USB link.

15. The system of claim 12 wherein the communications link is a wireless link.

16. The system of claim 12 wherein the at least one additional polling token comprises three additional polling tokens.

17. The system of claim 12 wherein the transmitting of a plurality of virtual endpoints occurs during a configuration of the HID.

18. The system of claim 12 wherein the HID memory non-transitory computer readable medium further has stored thereon software instructions that, when executed by the HID processor, cause the HID processor to execute steps comprising:
receiving dummy data from the HID when no additional data is available in response to one of the polling tokens, the dummy data having a maximum packet size.

19. The system of claim 12 further comprising:
a second HID;
a second HID processor mounted in the second HID;
a second HID memory coupled to the second HID processor, the second HID memory including non-transitory computer readable medium having stored thereon software instructions that, when executed by the second HID processor, cause the second HID processor to execute steps comprising:
transmitting, from the second HID to the host, a plurality of virtual endpoints for the second HID.

20. The system of claim 12 wherein the HID memory non-transitory computer readable medium further has stored thereon software instructions that, when executed by the HID processor, cause the HID processor to execute steps comprising:

reducing a report rate when no HID sensor data has been received for a specified amount of time.

* * * * *